(12) United States Patent
Themsen

(10) Patent No.: US 6,378,681 B1
(45) Date of Patent: Apr. 30, 2002

(54) CLUTCH

(75) Inventor: Jesper Thomas Holmegaard Themsen, Aalborg (DK)

(73) Assignee: MAN B&W Diesel A/S, Copenhagen (DK)

( * ) Notice: Subject to any disclaimer, the term of this patent is extended or adjusted under 35 U.S.C. 154(b) by 0 days.

(21) Appl. No.: 09/581,516

(22) PCT Filed: Nov. 20, 1999

(86) PCT No.: PCT/EP99/08967

§ 371 Date: Aug. 11, 2000

§ 102(e) Date: Aug. 11, 2000

(87) PCT Pub. No.: WO00/30933

PCT Pub. Date: Jun. 2, 2000

(30) Foreign Application Priority Data

Nov. 26, 1998 (DE) .......................... 198 54 570

(51) Int. Cl.[7] ...................... B63H 23/30; F16D 25/061
(52) U.S. Cl. ................. 192/86; 192/69.6; 192/85 A; 192/114 R; 74/661; 440/3; 440/4
(58) Field of Search ................. 192/69.6, 69.61, 192/69.62, 85 A, 86, 109 R, 114 R; 440/3, 4; 74/661

(56) References Cited

U.S. PATENT DOCUMENTS 2,812,840 A * 11/1957 Winter et al. ........ 192/69.61 X
6,033,271 A * 3/2000 Schafer ..................... 440/3

FOREIGN PATENT DOCUMENTS

DE 19623914 A1 4/1997
GB 1 335 907 10/1973

* cited by examiner

Primary Examiner—Richard M. Lorence
(74) Attorney, Agent, or Firm—Jones, Tullar & Cooper, P.C.

(57) ABSTRACT

In a clutch for coupling two shaft sections (2a, 2b) of a drive shaft, in which the shaft sections (2a, b) support an inner clutch ring (8) and an outer clutch ring (9) coplanar thereto and in which the clutch rings (8, 9) are provided with notches (19) which complement one another to bores (20) into which the hydraulically movable clutch bolts (22), fastened to a common servopiston (23), can be inserted. High operational safety and high user friendliness are achieved in that on the side of the clutch rings (8, 9) opposite the clutch bolts (22) a support ring (26) bridging their spacing (21) is arranged from which tie rods (27), supporting a locking ring (28) correlated with the clutch bolts (22), project that are arranged offset relative to the clutch bolts (22) and can be extended by a second servopiston (33). The two servopistons (23, 33) are arranged in a housing (11) connected to one shaft section (2a) and engaged from behind by the locking ring (28).

18 Claims, 5 Drawing Sheets

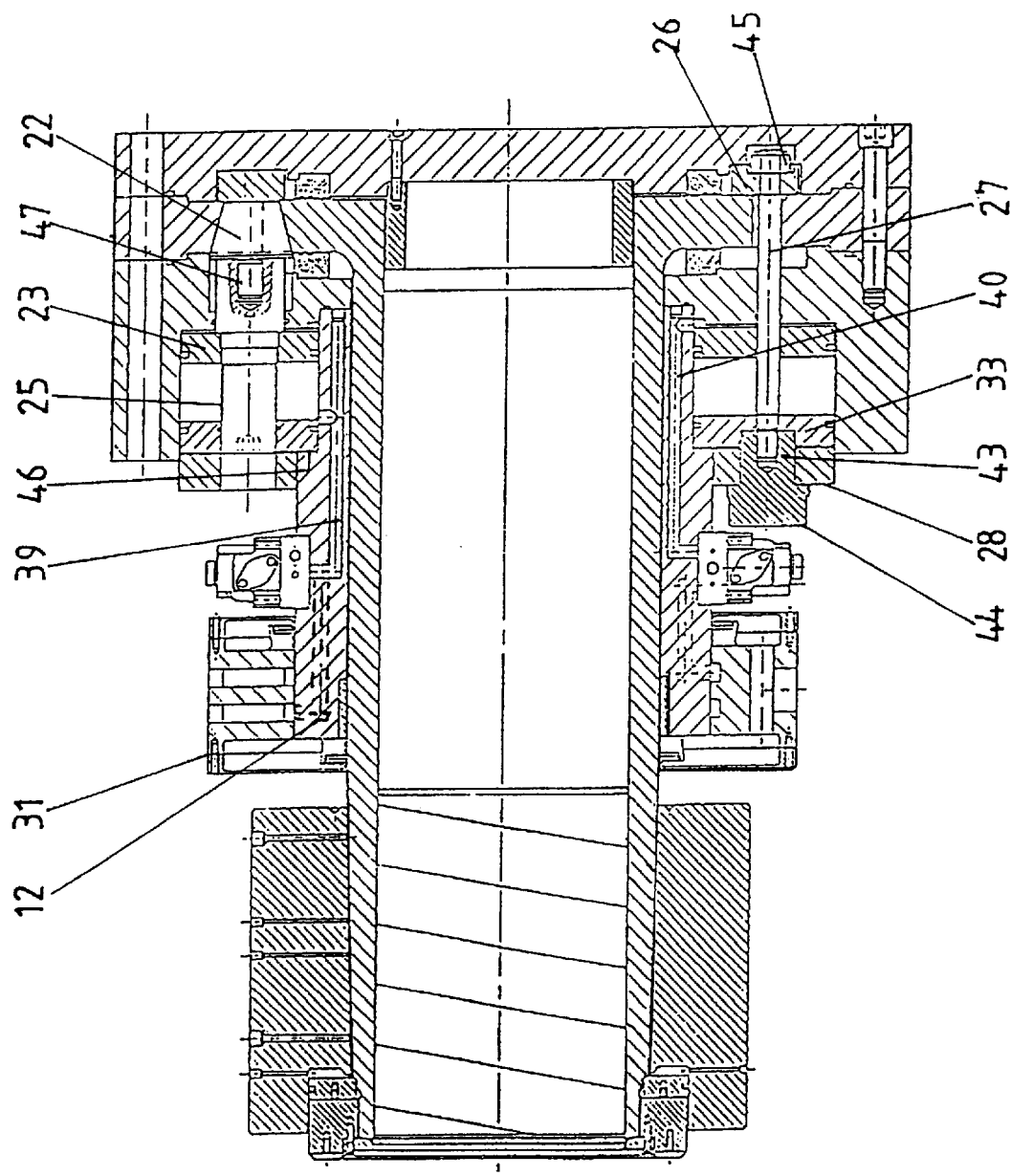

CLUTCH

FIELD OF THE INVENTION

The present invention relates to a clutch for coupling two shaft sections of a drive shaft, in particular of the drive shaft of a marine screw propeller which is alternativelydrivable by a main engine which is preferably embodied by a two-stroke large diesel engine or an auxiliary engine which is preferably embodied by an electric motor, wherein the shaft sections support an inner and an outer clutch ring coplanar thereto and wherein the clutch rings are provided with notches in the area of the facing circumferential surfaces which in a congruent position complement one another to preferably conical bores into which hydraulically moveable, preferably conical clutch bolts, which are actuatable by means of a common annular servopiston, can be inserted for fixedly connecting the clutch rings to one another for common rotation.

PRIOR ART

A clutch of this kind is disclosed in published German patent application 197 56 420. In this arrangement, the clutch bolts are not only hydraulically inserted and retracted but also held in the inserted position by hydraulic oil. During the entire time of insertion, it is therefore required to supply hydraulic oil. Due to the simultaneously occurring rotational movement of the shaft, leakage losses cannot be prevented in this context. Therefore, a comparatively large expenditure is required in order to maintain a sufficient pressure and to compensate the leakage losses. Moreover, the leaking oil results in contamination of the environment.

Based on this it is therefore an object of the present invention to improve a clutch of the aforementioned kind with simple and cost-efficient means such that the clutch bolts can be mechanically locked in the inserted position.

SUMMARY OF THE INVENTION

This object is solved according to the present invention in that a support ring bridging the gap between the two clutch rings is provided on the side of the clutch rings positioned opposite the bolts, from which tie rods, which can be extended by a second annular servopiston and cooperate with a locking ring assigned to the clutch bolts, project offset to the clutch bolts, wherein the locking ring, in the extended position of the tie rods, can be brought from a position in which it secures the clutch bolts in the inserted position into a position releasing the clutch bolts, and in that the two servopistons, which are movable hydraulically away from one another and toward one another, are arranged in an annular chamber of a housing connected to one of the shaft sections and engaged from behind by the locking ring.

With these measures, the disadvantages described at the outset are eliminated in a simple and inexpensive manner. With the aid of the locking ring the clutch bolts can be locked in the inserted position which ensures high reliability. After locking, the hydraulic oil loading is no longer necessary. Only a lubricant oil loading is required. Leakage losses are therefore not to be expected. This ensures in a simple manner a long disruption-free operation. For rotating the locking ring, the tie rods bearing it are simply tensioned by the corresponding servopiston and thus extended. The tie rods function accordingly as springs which hold together the locking ring and the support ring oppositely positioned thereto with the force exerted by these springs. The support ring resting with this force against the two clutch rings furthermore ensures that the two clutch flanges are exactly aligned so that the clutch bolts are effective over their entire length. Moreover, in the case of a conical configuration of the clutch bolts, it is ensured that in the desired congruent position precise conical bores correlated with the clutch bolts result into which the conical clutch bolts can be reliably inserted. The measures according to the present invention ensure accordingly also a high user-friendliness and operational safety.

The clutch bolts can have advantageously a respective shaft, that is fastened to the correlated servopiston, penetrates the second servopiston with a degree of freedom of movement, extends from the housing to the rear, and cooperates with the locking ring being provided with bores correlated with the shafts of the clutch bolts and being provided with arcuate slots correlated with the tie rods that penetrate the first servopiston with a degree of freedom of movement, project from the housing, and penetrate the arcuate slots. These measures ensure that the externally positioned locking ring can be rotated only when the tie rods are tensioned and, at the same time, the shafts of the clutch bolts are retracted therefrom, i.e., the clutch bolts are in the inserted position, which ensures especially high safety and clear operation.

A further advantageous measure can reside in that the tie rods penetrating the first servopiston with a degree of freedom of movement have a respective rearwardly arranged threaded portion on which at least one securing nut can be received that can be brought into contact at the locking ring. In this way, the spacing of the locking ring from the second servopiston and thus the effective tension and the achievable movement play can be adjusted in a simple manner.

Expediently, the second servopiston serving to tension the tie rods can be provided with a groove which can be closed off by a cover and in which follower nuts respectively screwable onto a correlated threaded portion of the tie rods are received. This allows in a simple manner an adjustment of the desired extension length of the tie rods and thus of the achievable securing forces.

In a further development of the primary measures the second servopiston for tensioning the tie rods can be lifted from a stop arranged between the two servopistons counter to a return spring arrangement. The return spring arrangement provides even in the pressureless state a certain lifting of the support ring relative to the clutch rings which can have a favorable effect with regard to preventing wear.

Further advantageous embodiments and expedient developments of the primary measures are disclosed and can be taken in more detail from the following description of an embodiment with the aid of the drawings.

BRIEF DESCRIPTION OF THE DRAWINGS

FIG. 6 is a further example of the inventive clutch in an illustration corresponding to that of FIG. 2.

DETAILED DESCRIPTION OF THE PREFERRED EMBODIMENTS

Figure 1:
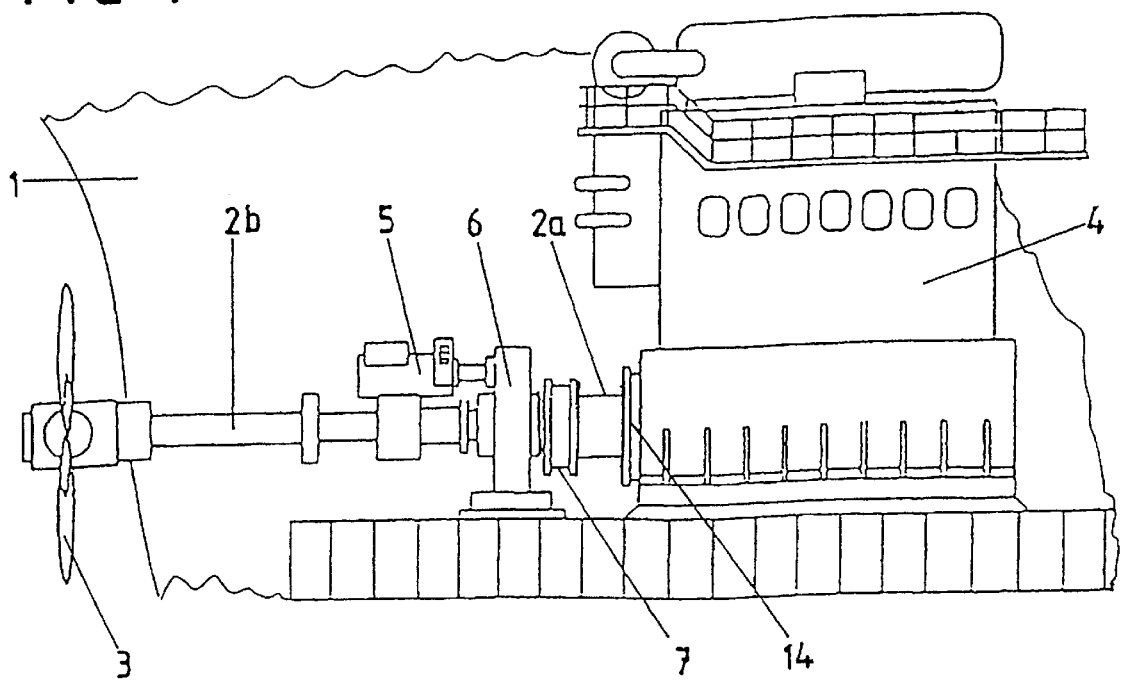
FIG. 1 is a view of a ship driving device in a schematic representation.

The driving device upon which FIG. 1 is based serves to drive a ship 1, illustrated only schematically, and comprises accordingly a screw propeller 3 provided with adjustable blades and arranged on an end of a shaft comprised of two shaft sections 2a, 2b. The screw propeller 3 is drivable via the shaft alternatively by a main engine 4 or an auxiliary engine 5. The auxiliary engine 5 will be used when the main engine 4 is not operational, for example, because of repair work. When the main engine 4 is inoperative, the ship can be maneuvered and/or can be propelled, for example, can be moved out of the harbor in case of danger, by its own power by means of the auxiliary engine 5.

A two-stroke large diesel engine is provided as the main engine 4 whose torque output is flanged to the shaft section 2a. An electric motor is provided as the auxiliary engine 5 which cooperates with the shaft section 2b via a tunnel gear 6. The electric motor can be a device that in normal operation, i.e., when the main engine 4 is active, operates as a driven generator and only in case of emergency can be operated as a motor to be supplied with current by auxiliary machines or a battery, not shown in detail. When the auxiliary engine 5 is activated, the main engine 4 is uncoupled. For this purpose, a clutch 7 is provided between the shaft sections 2a, 2b which will be explained in detail in the following.

Figure 2:
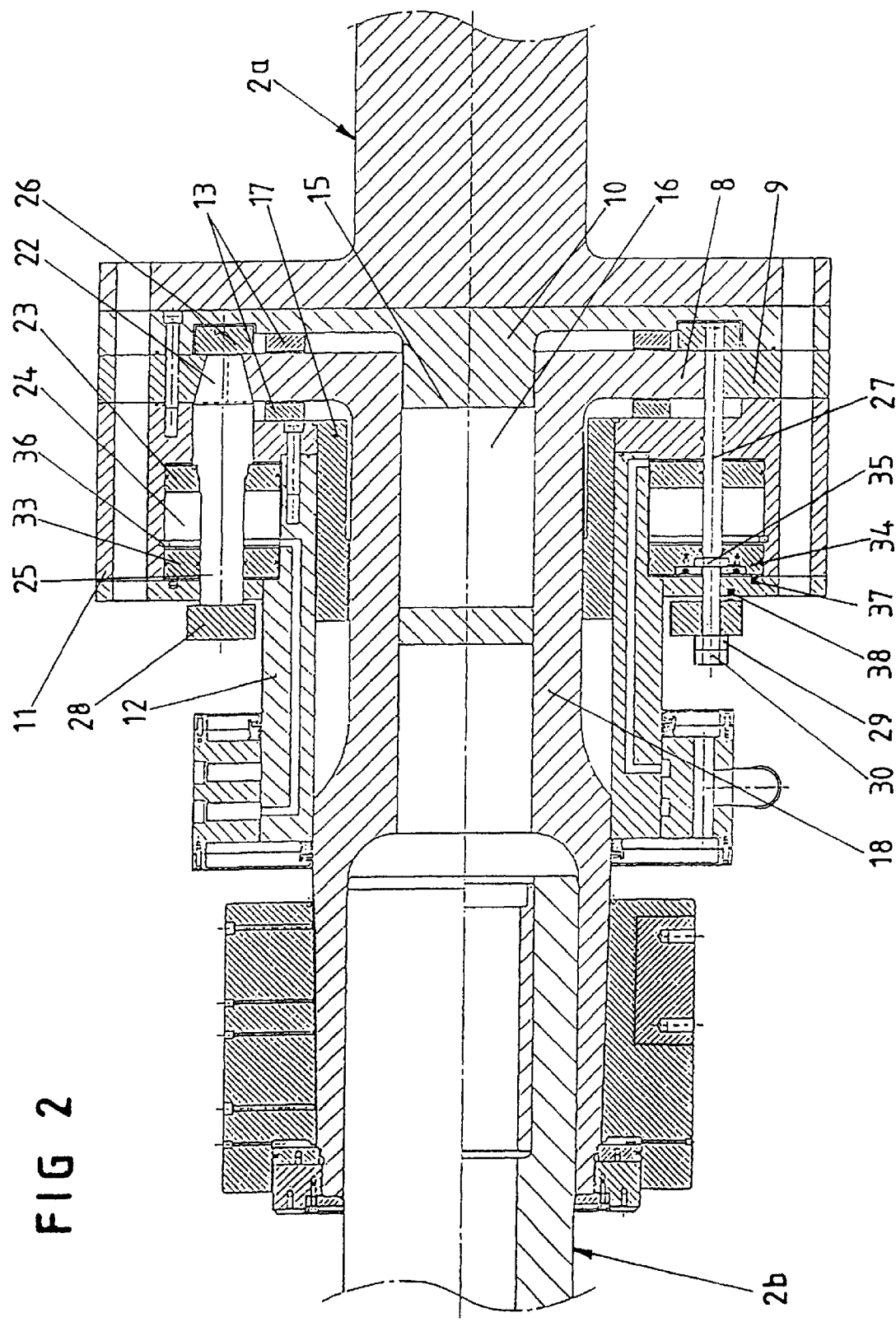
FIG. 2 is a section of a first example of the inventive clutch with clutch bolts being inserted.
Figure 3:
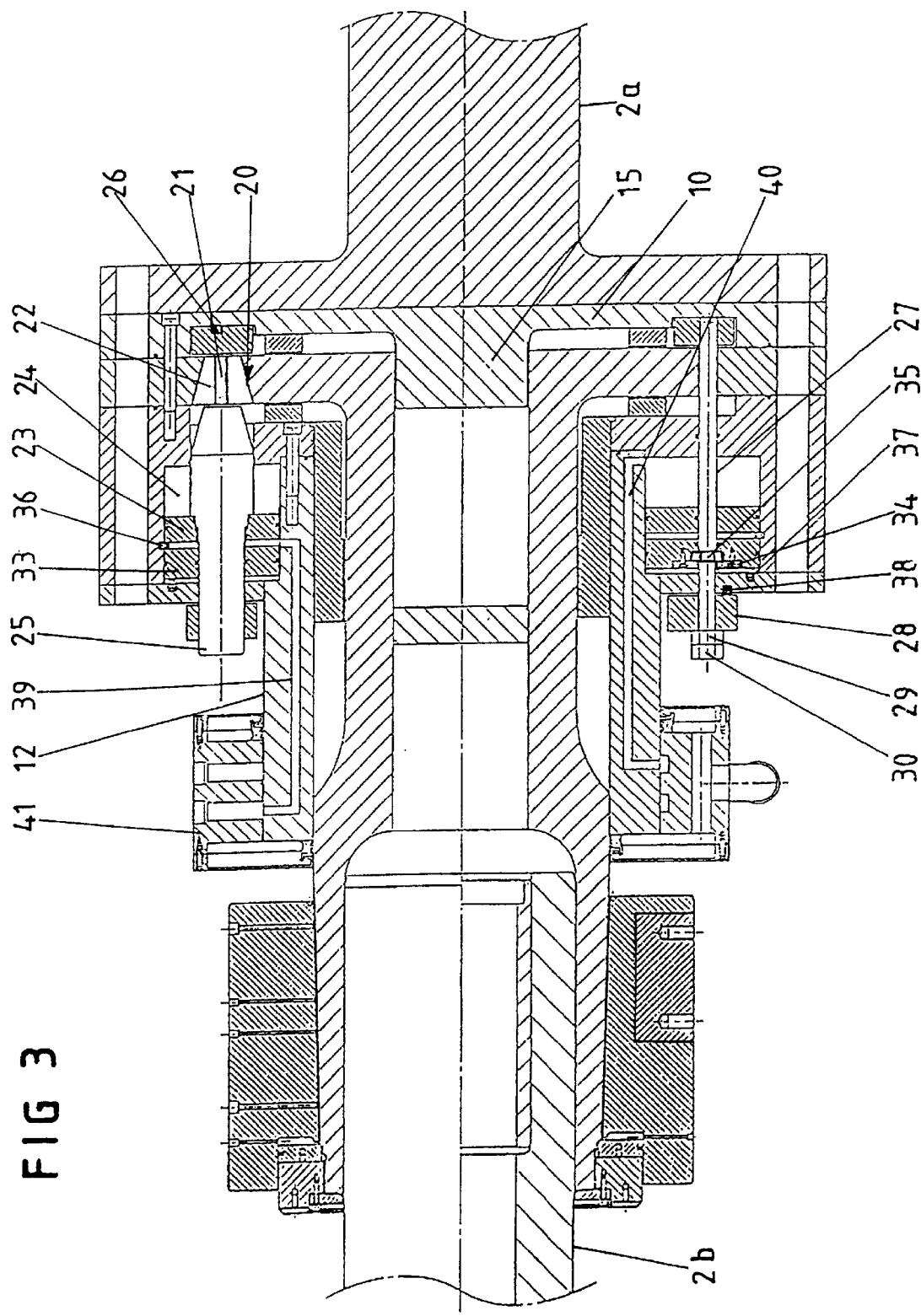
FIG. 3 to an arrangement according to FIG. 2 with clutch bolts being retracted.

The clutch 7 comprises, as can be taken from FIGS. 2 and 3, an inner clutch ring 8 and an outer clutch ring 9 which is coplanar thereto. The inner clutch ring 8 is embodied as a flange of the shaft section 2b at the screw propeller side. The comparatively small diameter of the clutch ring 8 allows a compact construction of the tunnel and thus of the entire tunnel gear 6. In the illustrated example, the shaft section 2b is provided with a projection 18 which is embodied as a hollow shaft supporting the inner clutch ring 8 and which is wedged onto the shaft section 2b. The two-part construction simplifies the manufacture. Here, the outer clutch ring 9 is connected with interposition of a support plate 10 to a flange of the shaft section 2a of the main engine side. A drum housing 11 is connected to the outer clutch ring 9 and engages behind the inner clutch ring 8 and surrounds the shaft section 2b. The radial inner wall of the drum housing 11 is part of a bushing 12 arranged on the shaft section 2b.

The inner clutch ring 8 is received between two axial bearings 13 that are mounted on the oppositely positioned sides of the drum housing 11 and the support plate 10 and transmit in any case the axial forces occurring within the shaft train through the clutch 7 to transfer them onto the axial bearing, indicated at 14 in FIG. 1, of the crankshaft of the two-stroke large diesel engine forming the main engine 4. For mutual radial support of the shaft sections 2a, 2b, the support plate 10 that is part of the shaft section 2a is provided with a bearing pin 15 which is supported in a correlated bore 16 of the shaft section 2b. Moreover, a bearing bushing 17 which is supported on the outer circumference of the shaft section 2b is inserted into the bore of the drum housing 11.

Figure 4:
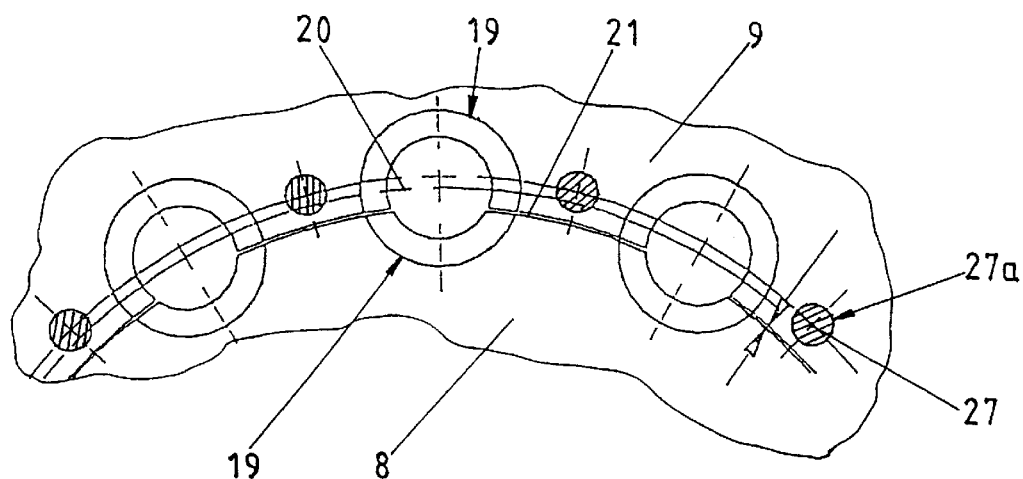
FIG. 4 is a partial view of the clutch rings.

The clutch rings 8, 9, as shown in FIG. 4, are provided in the area of the circumferential surfaces facing one another with axial notches 19 starting at a narrow circumferential gap 21. The notches 19 of the two clutch rings 8, 9 are arranged with identical mutual angular offset to one another and embodied such that in a mutual congruent position they complement one another to axial bores 20. Upon rotation of the two clutch rings 8, 9, the notches 19 can be brought into the mentioned congruent position in which the axial bores 20 result. FIG. 4 is based on this position. It is also recognizable from this Figure that the gap 21 has a somewhat smaller middle diameter than the partial circle correlated with the bores 20 formed by the notches 19 so that the notches 19 of the outer clutch ring 9 are greater than the notches 19 of the inner clutch ring 8.

The two clutch rings 8, 9 can be locked relative to one another and thus connected to one another for common rotation by clutch bolts 22 that can be inserted into the bores 20 formed by the notches 19 in the aforementioned congruent position. The clutch bolts 22 are loaded upon transmission of torque by shearing forces and can therefore be hardened. The bolts 22 are embodied as forwardly tapering conical bolts. Accordingly, the notches 19 also taper conically so that the bores 20 are embodied as conical bores. In FIG. 2 the clutch bolts 22 are in the inserted position, in FIG. 3 they are in the retracted position.

The clutch bolts 22 are received in the drum housing 11 whose oppositely arranged sidewalls are provided with bores correlated with the clutch bolts 22 via which the oppositely positioned bolt ends can be moved out of the drum housing 11. All of the clutch bolts 22 are connected to a common, hydraulically moveable annular servopiston 23 which is arranged in an annular chamber 24 of the drum housing 11. The clutch bolts 22 are provided here with shafts 25 which penetrate the correlated servopiston 23 and are connected thereto and which penetrate the sidewall of the drum housing 11 facing away from the clutch rings 8, 9, while the conical ends penetrate the sidewall facing the clutch rings 8, 9. The shafts 25 can be, as shown, integrally formed parts. A two-part variant is illustrated in FIG. 6.

A support ring 26 is provided on the side of the clutch rings 8, 9 facing away from the clutch bolts 22 which bridges the circumferential gap 21 and is arranged in an annular groove of the support plate 10. The support ring 26 provides an offset-free mutual alignment of the clutch rings 8, 9. Tie rods 27 projecting from the support ring 26 are offset in the circumferential direction relative to the clutch bolts 22 and are parallel thereto. The tie rods 27 can be shrink-fit into the support ring 26 or can be expediently screwed therein. The tie rods 27, as can be seen best in FIG. 4, are arranged in this embodiment such that they penetrate the outer clutch ring 9 and the drum housing 11 connected thereto which is provided with bores 27a offset relative to the notches 19. The partial circle correlated with the bores 27a has a different, in this case a larger, diameter than the circle defined by the bores 20 formed by the notches 19. The tie rods 27 therefore do not impede a relative rotation of the clutch rings 8, 9. The servopiston 23, provided for moving the clutch bolts 22, is penetrated by the tie rods 27 with a degree of freedom of movement. The tie rods 27 bear on their rearward ends projecting from the drum housing 11 a locking ring 28 arranged externally to the drum housing 11 which can block the clutch bolts 22 in the insertion position, upon which FIG. 2 is based, and which can be returned from this locking position, represented in FIG. 2, into a release position, represented in FIG. 3, in which the clutch bolts 22 can be retracted from the bores 20, and vice versa.

The locking ring 28 is penetrated by the rear portion of the tie rod 27 provided with a thread. A respective securing nut 29 and a correlated lock nut 30 are received on the thread. By adjusting the securing nut 29, against which the locking ring 28 rests, the effective length of the tie rod 27 and thus the resulting pretension of the clutch bolts 22 can be adjusted.

Figure 5:
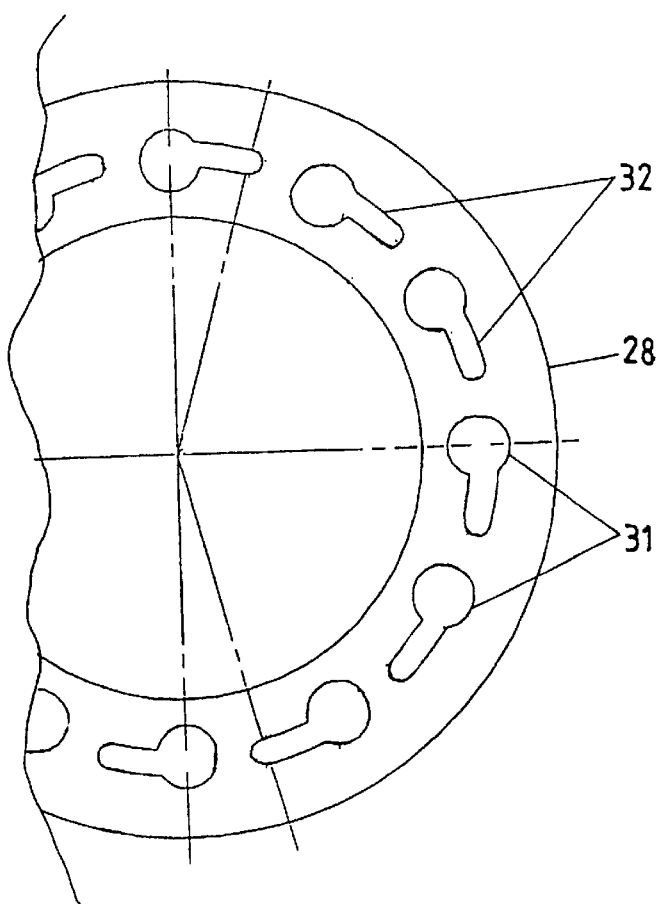
FIG. 5 is an end view of the locking ring.

The locking ring 28, as is especially well illustrated in FIG. 5, is provided with bores 31 correlated with the shafts 25 of the clutch bolts 22 and with arcuate slots 32 correlated with the tie rods 27. The diameter of the partial circle correlated with the bores 31 as well as the angular spacing of the bores 31 correspond to the partial circle diameter and the angular spacing of the clutch bolts 22 so that the locking ring 28 can be rotated into a position in which an alignment of the bolt and bore axes results. The diameter of the bores 31 corresponds to the diameter of the rearward shafts 25 of the clutch bolts 22 so that the shafts 25 in the aforementioned alignment position can be introduced into the bores 31, as can be seen in FIG. 3. In this position of the locking ring 28, the clutch bolts 22 can be brought into the disengaged position relative to the clutch rings 8, 9.

The length of the arcuate slots 32 penetrated by the tie rods 27 delimits the possible rotational angle of the locking ring 28. Expediently, the rotational angle is dimensioned such that a rotational path, corresponding approximately to the bore diameter, results in the area of the bores 31. The inner width of the arcuate slots 32 corresponds to the diameter of the tie rods 27 penetrating them. The diameter of the partial circle correlated with the arcuate slots 32 as well as the angular spacing of the arcuate slots 32 correspond to the partial circle diameter as well as the angular spacing of the tie rods. In the represented embodiment the arcuate slots 32 are directly connected to the bores 31, and this simplifies manufacture.

In the coupling position represented in FIG. 2, in which the bolts 22 are moved into the correlated bores 20, the locking ring 28 rests with the side facing the drum housing 11 against the rearward end face of the shafts 25 of the bolts. The aforementioned securing nuts 29 are adjusted such that the tie rods 27 are thereby pretensioned so that the support ring 26 contacts the clutch rings 8, 9 and aligns them relative to one another. At the same time, the bolts 22 are forced into the correlated bores 20 so that a play-free seat results. The locking ring 28 is lifted for adjusting it. For this purpose, the tie rods 27 are extended such that a sufficient movement play between the locking ring 28 and the securing nuts 29 as well as the rearward end faces of the shafts 25 of the clutch bolts 20 results.

For this purpose, a second servopiston 33 is arranged behind the first servopiston 12 in the annular chamber 24 of the drum housing 11 which is penetrated by the shafts 25 of the clutch bolts 22 with a degree of freedom of movement and on which tie rods 27 are supported which also penetrate it. To this end, the second servopiston 33 in the represented embodiment is provided in the area of its backside with recesses, widening the bores correlated with the tie rods 27 and closeable by a correlated cover 34, in which a follower nut 35 is inserted that can be threaded onto the threaded portion of the respectively correlated tie rod 27. By adjusting the follower nuts 35, the spacing between the support ring 26 and the second servopiston 33 and thus the length of the portion of the tie rod 27 that is extendible by a corresponding loading of the second servopiston 33 are adjusted.

Between the two servopistons 23 and 33 a fixed stop 36 is provided which is in the form of a spring ring on which the two servopistons 23, 33 rest in the basic coupling position, upon which FIG. 3 is based, in which the clutch bolts 22 are retracted.

For insertion of the clutch bolts 22, the space between the two servopistons 23, 33 is loaded with hydraulic oil. This results in the two servopistons 23, 33 being moved in opposite directions and away from the stop 36 wherein the support ring 26 comes to rest against the clutch rings 8, 9 and the clutch bolts 22 are moved into the correlated bores 20. The employed pressure is first of such a magnitude that the tie rods 27 are not yet extended and lengthened. The locking ring 28 is thus still blocked.

In order to be able to rotate the locking ring 28 and to bring it into the locking position, the pressure in the space between the two servopistons 23, 33 is increased to such a degree that the tie rods 27 are now extended under the effect of the forces acting on the second servopiston 33. At the same time, the clutch bolts 22 can be compressed under the effect of the forces acting on the first servopiston 23. The thus resulting length changes are dimensioned such that the locking a ring 28 is released and can be rotated. Accordingly, the locking ring 28 is moved into the locking position, upon which FIG. 2 is based, in which the shafts 25 of the clutch bolts 22 are out of alignment with the bores 31 at the locking ring. As soon as the pressure in the space delimited by the two servopistons 23, 33 is lowered, the extension of the tie rods 27 is canceled so that the locking ring 28 can be forced against the rearward end face of the shafts 25 of the bolts.

The tie rods 27 function here as pressing springs. The range of free movement provided to the second servopiston 33 is therefore dimensioned such that the extension of the tie rods 27 that can be caused by means of the second servopiston 33 is within the elastic range and accordingly can be completely reversed upon cancellation of the pressure. The degree of free movement provided to the first servopiston 23 corresponds to the insertion path of the clutch bolts 22 plus a possible elastic compression of these clutch bolts 22.

The rotation of the locking ring 28 can be accomplished manually. Of course, it is also possible to assign a machine-operated rotation device to the locking ring 28 which can be, in turn, remote-controlled from the bridge of the ship. In any case, the locking ring 28 provides a mechanical locking of the clutch bolts 22 in the inserted position upon which FIG. 2 is based so that no hydraulic pressure must be maintained. It is only required to supply the clutch with lubricant oil.

For retracting the clutch bolts 22, first the intermediate space between the two servopistons 23, 33 is again loaded with high pressure such that the locking ring 28 becomes free. The latter is subsequently brought into the position upon which FIG. 3 is based in which the axes of its bores 31 are aligned with the axes of the clutch bolts 22. The arcuate slots 32 penetrated by the tie rods 27 can serve in this context as a rotational stop. Subsequently, the space delimited by the two servopistons 23, 33 is relieved and at least the first servopiston 23 is loaded with pressure on the side facing away from the second servopiston 33 so that the clutch bolts 22 are brought into the position upon which FIG. 3 is based in which their shafts 25 engage the bores 31 of the locking ring 28. In the embodiment upon which FIGS. 2 and 3 are based, it would also be imaginable to load also the second servopiston 33 on the side facing away from the first servopiston 23 with pressure and to thereby reliably move it against the stop 36. In the represented embodiment this is realized by a return spring arrangement 37. In this manner, it is ensured that the support ring 26 is lifted, i.e., is lifted off the clutch rings 8, 9 in order to prevent wear. The locking ring 28 can also have a lifting spring arrangement 38 correlated therewith by which the locking ring 28 is lifted off the neighboring wall of the drum housing 11 when the tie rods 27 are extended.

The basic configuration and the basic function of the arrangement according to FIG. 6 correspond to that of the afore described embodiment. Accordingly, the differences are therefore described primarily in the following, wherein for same parts the same reference numerals are used.

In the arrangement according to FIG. 6 the tie rods 27 are provided with a rearward projection having a pin 43 screwed onto a threaded pin at the side of the tie rod and resting at the second servopiston 33 while penetrating the corresponding arcuate slot of the locking ring 28 with a degree of freedom of movement, wherein the pin is provided with a screw head 44 engaging behind the locking ring 28 and resting thereat. The opposite end of the tie rods 27 is provided with a threaded pin which penetrates the support ring 26 and supports a nut 45 by which the effective length of the tie rods 27 between the support ring 26 and the second servopiston 33 can be adjusted. The spacing of the support surface correlated with the locking ring 28, in this case of the screw head 44, from the second servopiston 33 is however not adjustable, in contrast to the first example according to FIGS. 2 and 3. However, a substantially simplified configuration results. The housing 11 can be open at the rear. The only thing required is a stop 46, for example, embodied as a step, correlated with the second servopiston 33. The locking ring 28 can be moved directly against the second servopiston.

A further variant which can be taken from FIG. 6 is the threaded connection, indicated at 47, of the clutch bolts 22 with the respectively correlated shaft 25. This two-part configuration allows an adaptation of the length of the shafts 25 to the conditions of individual situations by providing one or more washers between the conical clutch bolts 22 and the respectively correlated shaft 25.

The above-mentioned pressure loading is realized by pressure lines 39, 40 that are formed as channels integrated in the bushing 12 that forms partially an inner limitation of the drum housing 11 and that extend from a distribution ring 41 engaged by the bushing 12. For providing the required hydraulic pressure for actuating the servopistons 23, 33, a suitable correlated pressure source is provided. However, the arrangement is such that the pressure in the case of failure of the correlated pressure source can, if needed, be taken from other machine-correlated pressure sources, for example, the pressure sources assigned to the screw propeller 3, or, as a last resort emergency measure, can be provided by means of a hand pump, not represented in detail. This ensures that the clutch bolts 22 can be actuated in any situation, and this ensures a high safety.

What is claimed is:

1. A clutch for coupling two shaft sections of a drive shaft, the shaft sections supporting an inner clutch ring and an outer clutch ring coplanar thereto, said clutch rings being provided with notches in the area of the facing circumferential surfaces, which in a congruent position complement one another to bores, into which hydraulically movable clutch bolts can be inserted which fixedly connect the clutch rings to one another for common rotation and can be actuated by a common annular servopiston, wherein on the side of the clutch rings opposite the clutch bolts a support ring, bridging a gap between the two clutch rings, is arranged from which tie rods, offset relative to the clutch bolts, project that can be extended by a second annular servopiston and cooperate with a locking ring correlated with the clutch bolts, and wherein the locking ring, when the tie rods are extended, can be moved from a position in which the clutch bolts are secured in their insertion position into a position for releasing the clutch bolts, and in that the two servopistons, which are hydraulically movable away from one another and toward one another, are arranged in an annular chamber of a housing connected to the shaft section and engaged from behind by the locking ring.

2. The clutch according to claim 1, wherein the clutch bolts each have a shaft that is fastened to the correlated servopiston, penetrates the second servopiston with a degree of freedom of movement, extends rearwardly from the housing, and cooperates with the locking ring provided with bores correlated with the shafts of the clutch bolts and with arcuate slots correlated with the tie rods or the tie rods projections penetrating the first servopiston with a degree of freedom of movement.

3. The clutch according to claim 1, wherein the tie rods, penetrating the first servopiston with a degree of freedom of movement, each have a rearward threaded portion on which at least an adjustable stop that can be brought into contact at the locking ring is received.

4. The coupling according to claim 1, wherein the second servopiston serving to tension the tie rod cooperates with adjustable stops receivable respectively on a correlated threaded portion of the tie rods and closeable by a cover, of the second servopiston.

5. The clutch according to claim 4, wherein said adjustable stops are arranged in a correlated recess.

6. The clutch according to claim 1, wherein the tie rods, penetrating the first servopiston with a degree of freedom of movement, are provided with a rearward projection which has a head resting at the locking ring and a pin projecting therefrom which penetrates the locking ring and rests against the second servopiston.

7. The clutch according to claim 1, wherein a fixed stop is provided between the servopistons against which the two servopistons can be moved in opposite directions during retraction of the clutch bolts.

8. The clutch according to claim 1, wherein the second servopiston serving to tension the tie rods can be lifted off the stop counter to a return spring arrangement.

9. The clutch according to claim 1, wherein the locking ring has correlated therewith a lifting spring arrangement.

10. The clutch according to claim 1, wherein the tie rods are screwed to the support ring.

11. The clutch according to claim 1, wherein the radially inner wall of the housing receiving the servopistons is part of a bushing, surrounding a shaft section that is correlated with the inner clutch ring, which engages a distributor ring provided with hydraulic medium connectors and has pressure medium lines for pressure loading the servopistons.

12. The clutch according to claim 1, wherein the inner clutch ring is positioned between two axial bearings positioned opposite one another and fastened to the housing and to a part of the shaft section correlated with the outer clutch ring, on which the outer clutch ring as well as the housing are supported.

13. The clutch according to claim 1, wherein the shaft section correlated with the inner clutch ring is at least partially embodied as a hollow shaft in which a bearing pin, projecting from the other shaft section, is supported and on which the housing is preferably supported by an inserted bearing bushing.

14. The clutch according to claim 1, wherein the drive shaft comprises a marine screw propeller, alternatively drivable by a main engine.

15. The clutch according to claim 14, wherein the main engine is embodied as a two-stroke large diesel engine, or an auxiliary engine.

16. The clutch according to claim 15, wherein said auxiliary engine comprises an electric motor.

17. The clutch according to claim 1, wherein said bores are conical.

18. A clutch for coupling two shaft sections of a drive shaft, in which the shaft sections support an inner clutch ring and an outer clutch ring coplanar thereto and in which the clutch rings are provided with notches which complement one another to form bores into which hydraulically movable clutch bolts, fastened to a common servopiston, can be inserted, a second servopiston, a support ring arranged to bridge the spacing between said clutch rings from which tie rods, supporting a locking ring correlated with the clutch bolts, project, said clutch rings being arranged offset relative to the clutch bolts and extended by said second servopiston, and wherein the two servopistons are arranged in a housing connected to one shaft section and engaged from behind by said locking ring.

* * * * *